No. 684,040. Patented Oct. 8, 1901.
H. H. BLISS.
MANUFACTURE OF CHAIN LINKS.
(Application filed Apr. 6, 1892.)
(No Model.) 2 Sheets—Sheet 1.
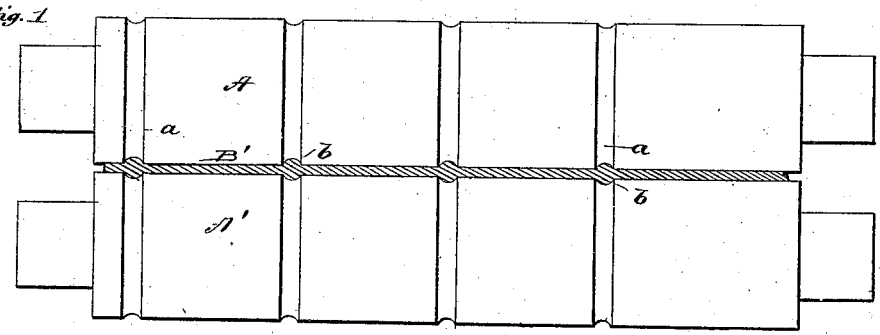
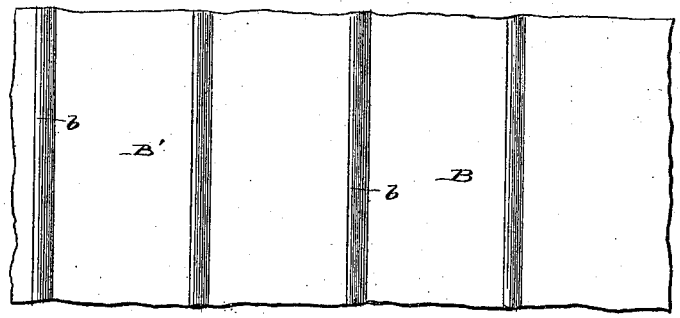
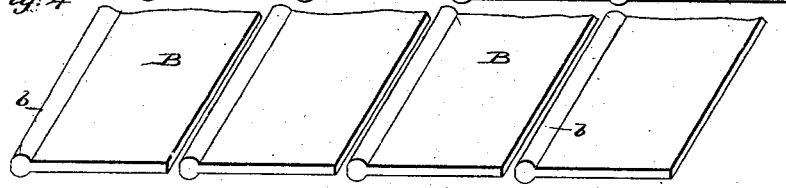
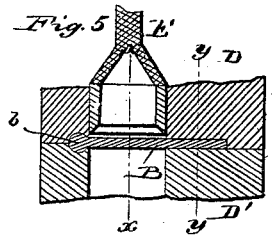
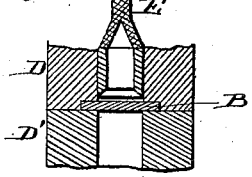
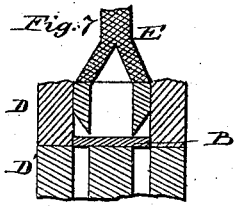
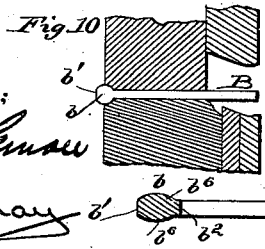
Witnesses:
Inventor
Henry H. Bliss
THE NORRIS PETERS CO., PHOTO-LITHO., WASHINGTON, D. C.

No. 684,040. Patented Oct. 8, 1901.
H. H. BLISS.
MANUFACTURE OF CHAIN LINKS.
(Application filed Apr. 6, 1892.)
(No Model.) 2 Sheets—Sheet 2.

Witnesses
Marcus J. Byng
R. B. Cavanagh

Inventor
H. H. Bliss
by Doubleday & Bliss
Attorneys

UNITED STATES PATENT OFFICE.

HENRY H. BLISS, OF WASHINGTON, DISTRICT OF COLUMBIA, ASSIGNOR TO JOSEPH A. JEFFREY, OF COLUMBUS, OHIO.

MANUFACTURE OF CHAIN-LINKS.

SPECIFICATION forming part of Letters Patent No. 684,040, dated October 8, 1901.

Application filed April 6, 1892. Serial No. 428,042. (No model.)

*To all whom it may concern:*

Be it known that I, HENRY H. BLISS, a citizen of the United States, residing at Washington, in the District of Columbia, have invented certain new and useful Improvements in the Manufacture of Chain-Links, of which the following is a specification, reference being had therein to the accompanying drawings.

This invention relates to improvements in the process or method of manufacturing chain-links, particularly the links for such chains as are employed for driving machinery or transmitting power from one sprocket-wheel to another; and it consists in the process or steps of procedure hereinafter pointed out in detail, whereby such links are manufactured from sheets or plates of metal.

Figure 11:
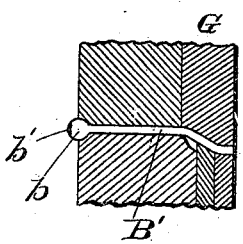
Figure 12:
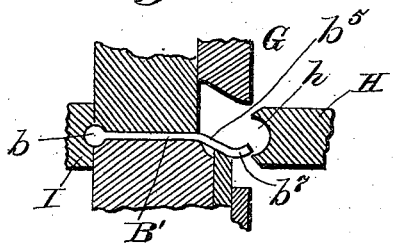
Figure 13:
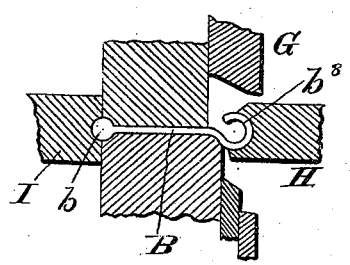
Figure 16:
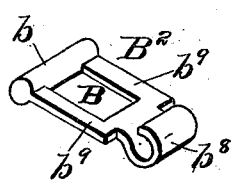
Figure 14:
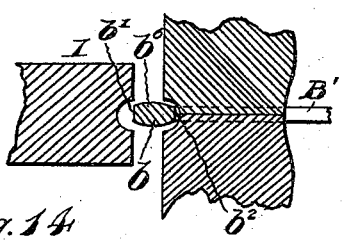
Figure 15:
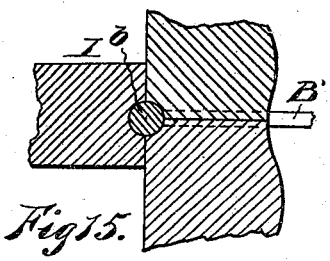

Figure 1 shows more or less conventionally a pair of rolls adapted to give the sheet metal the initial shape desired. Fig. 2 is a plan view of part of a rolled sheet. Fig. 3 is an end view or cross-section of a sheet and showing planer-cutters adapted to cut the sheet into strips. Fig. 4 is a perspective of several of the strips. Figs. 5 and 6 are a section and a cross-section of the parts for forming the sprocket-aperture in the link. Fig. 7 shows the parts for forming the tongue at the end of the blank which is to be bent into the hook. Fig. 8 is a perspective of the blank prior to bending. Fig. 9 is a longitudinal section of the same on a larger scale. Figs. 10 and 11 are sections showing the parts for giving the first bend to the blank. Figs. 12 and 13 show the parts for forming the end bar and curling the hook. Figs. 14 and 15 show, on a larger scale, the parts for forming the end bar. Fig. 16 is a perspective of the finished link.

In carrying out my invention a mass of steel or other suitable metal is first heated sufficiently high to permit it to be shaped so as to have the form of a sheet having the features to be described below. I do not limit myself to any particular devices for effecting this shaping of the heated metal, though at present I prefer to employ the process of rolling.

In the drawings, A A' represent a pair of rolls so grooved and shaped as to impart to a sheet of steel or other metal a series of cylinder-like beads, ribs, or enlarged parts, as shown at $b$, to serve a purpose to be described. This sheet of metal is indicated at B'. (See Figs. 1, 2, and 3.) After the operation of rolling has been completed and the metal has been cooled and is in a proper condition it is cut into proper lengths and placed in a suitable machine, preferably one of the nature of the planer, and by means of a series of cutters, as shown at C C, Fig. 3, the sheet B' is cut into a number of strips or bars, such as are partially indicated in Fig. 4. The cutters C are so adjusted and arranged as to sever the strips on lines immediately adjacent to the enlarged or ribbed parts $b$. It will be seen that I thus produce a number of elongated bars of metal, each of which has along one edge an enlarged part which can be utilized as the end bar of a link. The strips thus produced are then taken and subjected to a series of actions of the following character: I prefer to form first the central sprocket-aperture in each link—that is, form it prior to severing the link-blank from the strip. This can be accomplished by devices substantially such as are indicated in Figs. 5 and 6, where D D' represent the operated parts of gripping or holding dies so shaped as to receive one of the strips or bars (shown in Fig. 4) and hold it firmly while the cutting-die, as at E, Fig. 5, is removing the metal from the central aperture. After this aperture has been formed the bar or strip may be advanced a certain distance sufficient to have the next operation performed, or the bar may be held in the first position and another set of tools may be brought into action after the cutter E has been withdrawn. I prefer to advance the strip a distance equal to the width of a blank for the next operation, which is the cutting of the shoulders at $b^4$ to form the reduced tongue part $b^5$ and the severing of the blank. The latter step may be taken simultaneously with the forming of the tongue $b^5$ or subsequently, or the recess on one side of one blank and the opposite recess on the next blank may be formed at one operation and a blank may be severed at the same instant.

After the cutting of the central aperture and the edges of the blank has been accomplished the steps are taken by which it is bent or "upset," so as to provide a circular cross-bar at one end and an open hook at the other, said cross-bar to be of greater through dimensions than the original blank and said hook to have an open throat narrower than the end bar, but capable of permitting the lateral movement of one link relatively to another because of the dimensions of the side bar of the link being such as to permit them to pass through the said throat. The links are detachable when in an unusual position relatively to the working line of the chain, but are prevented from uncoupling while in such line, this possibility of uncoupling at certain times being due to the relative dimensions of the end bar, the side bars, the hook, and its throat or entrance and being particularly due to the fact that the end bar is thicker than the side bars.

Heretofore it has been attempted to produce from sheet metal a link of the described character and to form the round end bar by swaging or "upsetting" the metal from a cross plate or bar originally rectangular in section and of the same thickness as the sheet; but it has been found very difficult to so swage or upset the metal from an elongated rectangular section to a circular section, owing to the large amount of displacement of metal, especially in the thicker links, which displacement is not only resisted with great force and can be accomplished only by very heavy and powerful machinery, but also results in so attacking the fibers of the metal as to seriously impair the efficiency of the end bar as a pintle or journal.

I obviate the difficulties which have been experienced as above described by first rolling the sheet metal in such way as to provide the above-described ribs or beads. These may be initially made angular in section or with surfaces giving in section arcs of the same circle, or they may be made more nearly elliptical in section, as is shown in Fig. 9. When made as last described, I provide sufficient stock to produce a perfectly-round bar, and yet do it in such way as to avoid the excessive swaging which is required when this part of the blank is rectangular in section and of the same thickness as the original sheet, and, moreover, I am enabled to provide smooth wearing or journal surfaces at $b'$ $b^2$, where the cutters C and E necessarily produce rectangular surfaces.

By examining Figs. 14 and 15 it will be seen that the cavities in the gripping-dies and in the swaging-die I form a chamber when the dies are in contact, which is circular in section and of such dimensions that the stock or metal constituting the bar $b$ will snugly fill it after the compression has been exerted. It will also be seen that a comparatively slight swaging action is required to accomplish this, owing to the fact that the metal already approximates the desired circular form. This swaging-die I and the curling-die H may be arranged to operate simultaneously or successively, as preferred. The action of the curling-die need not be described in detail, as it will be readily understood by those skilled in the art of working sheet metal. It has a cavity at $h$, whose face is so shaped that when the die is forced toward the blank the curved lip $b^7$ is impinged upon by the wall of the cavity $h$, and said wall bends or curls the part $b^5$ of the blank around to form a hook, as at $b^8$. The finished link is shown in Fig. 16.

I am aware of the fact that it has been proposed to roll separate bars or strips—that is, bars each of a width equal to the length of the desired link-blank, and each to be rolled with a round rib at one edge to provide the end bars of the links and with a depressed part at the opposite edge, from which the knuckles or hooks are to be subsequently produced—but a number of disadvantages are incident to this process of manufacture. In the first place, it is much more expensive, because of the large increase in the handling of the metal which is necessary. Again, in practice it is found that rolls cannot be so arranged as to produce the finished surface upon the outer side of the end bar which it is desired to have, the rolls in practice always leaving a fin or web. Again, it is found that the metal bars or strips are of such various widths, due to the inequalties in compression and expansion during the rolling process, that it is not practicable to insure an absolute uniformity in the lengths of the blanks cut therefrom or in the lengths of the links produced from the blanks, and such uniformity is an essential requisite in order that the chains may be throughout of exactly the same "pitch." I obviate these various difficulties. By two handlings of the metal I provide longitudinal bars or strips of such a total length that the output greatly exceeds that which results from the other plan just referred to, as the two handlings produce a large number of bars or strips at one time, while in the other case these two handlings are required for each bar separately; but a much greater importance is incident to the fact that the links can be produced with an exactitude of dimensions that is not attainable in the other process. By severing the longitudinal bars from the sheet by cutters accurately adjusted the bars are necessarily of exactly the same width throughout, the blanks are all of exactly the same length, and therefore the pitch of the links is uniform.

I am also aware of the fact that it has been proposed to roll a strip of metal having swelled or rounded thick beads, one along each edge, and having midway between the edge beads a depression, such strip being adapted to be cut into two strips severed longitudinally along the longitudinal line of the depressed part of the initial strip, and I do not claim such an article or the method of manufacture of links therefrom as coming within my invention; but my manner of manufacture differs materially from that last referred to. When a strip with two beads along the edges is rolled, it is capable of providing only two blanks when considered transversely. One of the objects of my invention is to cheapen the process of manufacture of sheet-metal links by forming the initial plate in such way that a very large number of small links can be cut therefrom, the number, in fact, being indefinite as concerns the transverse dimensions of the initial sheet and governed only by the capacity of the rolls. In my case the sections or substrips of the initial plate are all counterparts of each other, not only in shape, but in their positions relative to the lines of the sheet—that is to say, the said sections or substrips are not inverted as to each other at any point. When so inverted transversely, only two links or link-blanks can be obtained by cutting transversely. It is impracticable to roll sheets for this purpose with more than two link lengths on transverse lines if each strip is to have two beads along its outer edges and a depression midway between them. Again, as is well known to those acquainted with rolling such sheets as these, it is impossible to produce a true rectilinear finished edge or surface at the outer side of the rounded beads, as slight fins or webs will be produced, to remove which necessitates a subsequent operation of cutting or emery-grinding; but when the initial plate is produced in the manner I have provided the planer-cutters employed at a subsequent stage can be adjusted with such accuracy that at one traverse of the rolled plate under these cutters the pitch length of the ultimate link can be precisely obtained, the cutters being so adjusted as to the outer lines of the thickened ribs as to leave them in condition for articulation at the same time that the severing of the plate into the blank-strips is accomplished.

What I claim is—

1. The herein-described improvement in the art of making chain, it consisting in subjecting a mass of metal to heat, then, while in a heated condition, forming a relatively thin plate of said metal, said plate having parts extending longitudinally thereof and each varying in cross-section, all being counterparts of each other in position and in shape, then cooling the said sheet, then cutting said sheet longitudinally along the planes of division between the thicker parts and the thinner and forming bars or strips, each bar being thicker at one edge than at the other, then cutting said strips transversely to form link-blanks, curling each blank at one end to form a knuckle or hook and cutting a central aperture in said blank, substantially as set forth.

2. The herein-described metal sheet for the manufacture of link-blanks, it having a transverse series of several longitudinally-extending parts, each varying in thickness in transverse section and all counterparts of each other in position relatively to the sheet and in shape, it being adapted to have bars or strips cut therefrom, each thicker at one edge than at the other, substantially as set forth.

3. The herein-described metal sheet for the manufacture of link-blanks, it having a transverse series of several longitudinally-extending parts, all counterparts of each other in position in relation to the sheet and each part having along one edge a cylinder-like bead or enlargement, said sheet being adapted to have the said parts severed from each other by cutting along the edges of the said beads, substantially as set forth.

In testimony whereof I affix my signature in presence of two witnesses.

HENRY H. BLISS.

Witnesses:
MARCUS B. MAY,
R. G. DU BOIS.